Patented Sept. 18, 1951

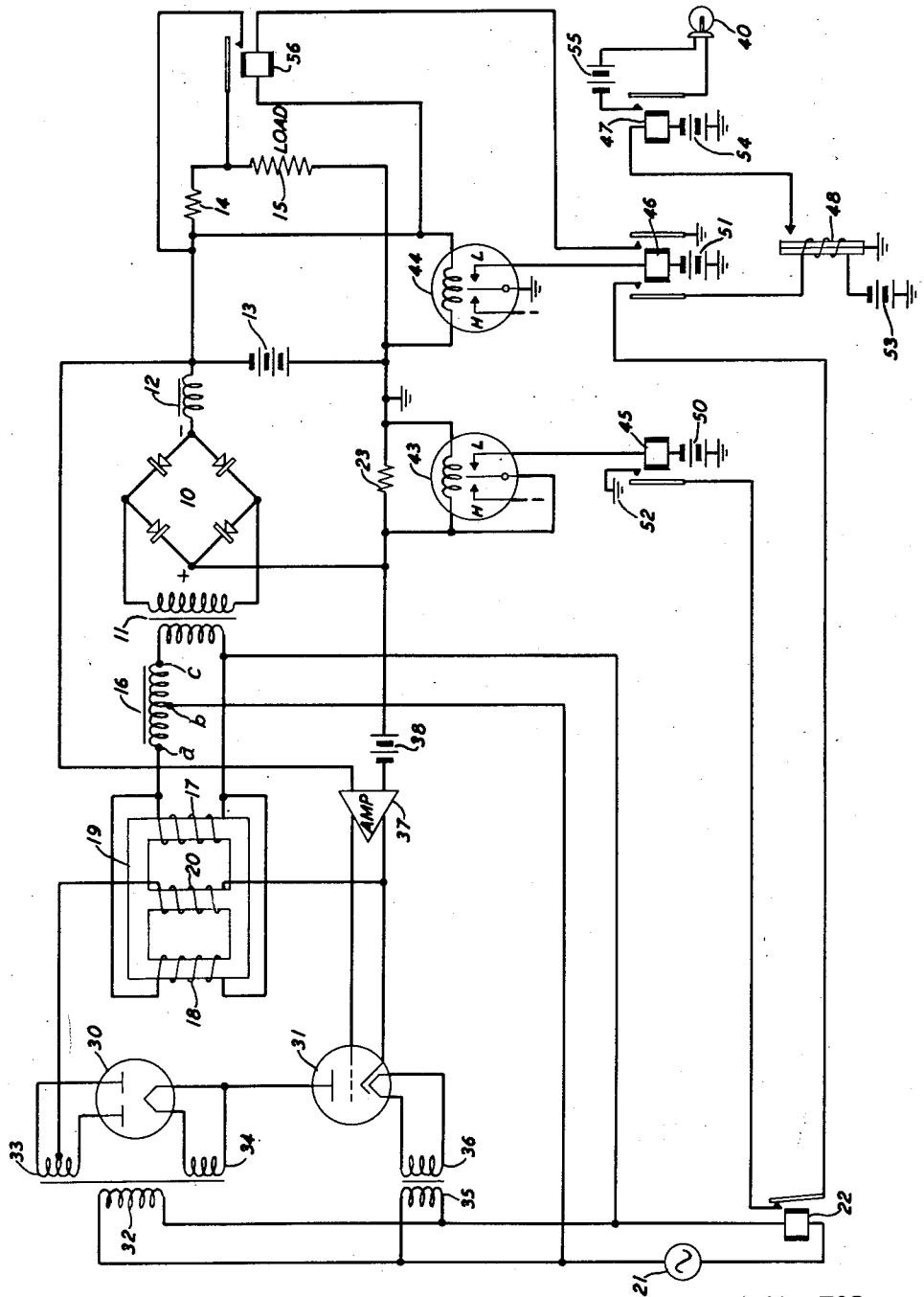

2,568,172

UNITED STATES PATENT OFFICE 2,568,172

CURRENT SUPPLY APPARATUS

Harry H. Spencer, Springfield, N. J., assignor to Bell Telephone Laboratories, Incorporated, New York, N. Y., a corporation of New York Application April 20, 1950, Serial No. 156,995

2 Claims. (Cl. 320—48)

This invention relates to current supply apparatus and more particularly to an arrangement in which a rectifier normally supplies current to a load and to a battery for charging it and in which means are provided for maintaining the load voltage within normal operating limits during a period following a power failure.

In accordance with a feature of the invention, there is provided an alarm circuit which is energized to produce an alarm only in response to a rectifier failure.

In a specific embodiment of the invention herein shown and described for the purpose of illustration, a varistor bridge rectifier is provided for rectifying alternating current supplied thereto and for supplying the rectified current to a load circuit comprising a storage battery and a load connected in a current path across the battery. Suitable means of the type disclosed in a copending application of J. A. Potter, Serial No. 134,916, filed December 24, 1949 (Patent No. 2,563,486, granted August 7, 1951), for example, are provided for regulating the alternating current supplied to the bridge rectifier in response to load voltage changes for minimizing the load voltage changes. When the supply of rectified current to the battery and load is interrupted due to a power failure, for example, current is supplied to the load from the battery. A resistor is connected in series with the load between a terminal of the battery and a terminal of the load to cause the load voltage to be reduced with respect to the battery voltage. However, when the battery voltage decreases below a normal operating range due to failure of the rectified current supply, for example, a relay responsive to the battery voltage causes the completion of a short-circuiting path across the series resistor, thereby increasing the load voltage to the battery voltage. There is also provided an alarm system for giving an alarm when a rectifier failure occurs and which does not give an alarm in response to a power service failure or in response to low rectifier output during the time required for heating to operating temperature cathodes of space current devices associated with the rectifier.

The invention will now be described in greater detail with reference to the accompanying drawing the single figure of which is a schematic view of a current supply system embodying the invention.

Referring to the drawing, there is provided a bridge-type rectifier 10 having selenium or other suitable rectifying elements in the arms of the bridge, the input terminals of the bridge being connected to the secondary winding of an input transformer 11. When alternating current is supplied through transformer 11 to the rectifier 10, it supplies rectified current through a filtering choke coil 12 and through a resistor 23 to a battery 13. Rectified current is also supplied to a current path connected across battery 13 comprising resistor 14 and a load 15 in series. The positive terminal of battery 13 is connected to ground.

The primary winding of transformer 11 is connected in series with the winding $abc$ of an autotransformer 16 and the windings 17 and 18 in parallel of a saturable reactor 19 which also has a saturating winding 20. Alternating current from a supply source 21 is supplied through the winding of a relay 22 to the circuit comprising autotransformer 16, reactor windings 17 and 18 and the primary of transformer 11, one terminal of the source 21 being connected to the mid-terminal $b$ of autotransformer 16 and a terminal of the winding of relay 22 being connected to a common terminal of reactor windings 17, 18 and of the primary of transformer 11. The alternating current supplied to the primary of transformer 11 is controlled by varying the unidirectional current flowing through saturating winding 20 of saturable reactor 19 to change the reactance of windings 17 and 18. When the reactance of windings 17, 18 is such that the current flowing through portion $ba$ of autotransformer 16 is equal to the current flowing through portion $bc$, the voltage across $bc$ is equal to zero because the current flowing in portion $ba$ induces in portion $bc$ a voltage equal and opposite to the voltage across portion $bc$ produced by the current flowing through it. For this condition, the voltage across the primary of transformer 11 is substantially equal to the voltage of source 21. The current flowing through portion $ba$ of the autotransformer 16 induces in portion $bc$ a voltage which aids the voltage of source 21. Therefore, a decrease of current in winding portion $ba$ due to an increase of reactance of windings 17, 18 reduces the voltage induced in portion $bc$ to cause the voltage impressed upon the transformer 11 to decrease. Likewise, an increase of current flowing through portion $ba$ of the autotransformer causes the voltage supplied to the primary of transformer 11 to increase.

Current is supplied to winding 20 of saturable reactor 19 by an auxiliary rectifier comprising a space current rectifying device 30, the amplitude of the current being controlled by the resistance of the space current path of a triode space current device 31. There are provided a transformer having a primary winding 32 and secondary windings 33 and 34, and a transformer having a primary winding 35 and a secondary winding 36. The primary windings 32 and 35 are connected through the winding of relay 22 to the current supply source 21. Transformer winding 34 supplies heating current to the filamentary cathode of rectifier tube 30 while transformer winding 36 supplies current to the heater of tube 31 to increase the temperature of the indirectly heated cathode. The end terminals of transformer winding 33 are connected to the anodes, respectively, of tube 30 and the mid-terminal of winding 33 is connected to one terminal of reactor winding 20. The other terminal of winding 20 is connected to the cathode of tube 31 and the anode of tube 31 is connected to the cathode of tube 30, thereby completing a circuit for supplying current rectified by tube 30 to saturating winding 20.

The current supplied to saturating winding 20 may be varied in response to voltage changes across the battery 13 to thereby control the alternating voltage supplied to rectifier 10 so as to minimize the load voltage variations. For this purpose the voltage across the battery 13 is connected in series with a source of fixed reference voltage 38 of opposite polarity to the input of a vacuum tube amplifier 37, the output voltage of the amplifier being impressed upon the control grid-cathode circuit of space current device 31. If the load voltage should increase, for example, the voltage impressed from amplifier 37 upon the grid-cathode circuit of tube 31 changes in a direction to make the control grid of tube 31 relatively more negative with respect to its cathode. The current supplied to saturating winding 20 is thereby caused to decrease, thus increasing the reactance of windings 17 and 18. The resulting decrease of the voltage impressed upon the rectifier 10 causes battery 13 to discharge and the voltage across it to decrease. The initially assumed increase of load voltage is thus minimized.

Apparatus is provided for energizing an alarm to indicate a failure of a regulated rectifier to supply rectified current to the load circuit. Such a failure may occur, for example, due to a failure of tube 30 or tube 31, thereby interrupting the supply of saturating current to the winding 20 of saturable reactor 19. To prevent false indications, means are provided to permit energization of the alarm only in response to (1) zero or abnormally low rectifier output current, (2) normal power service, (3) abnormally low battery voltage, and (4) an elapsed time sufficient to permit the heating to operating temperature of cathodes of space current devises such as tubes 30 and 31. For this purpose there are provided for controlling the energization of a lamp 40 or other suitable indicating device a relay system comprising electromagnetic relays 22, 43, 44, 45, 46 and 47, and a thermostatically operated relay 48. The winding of relay 43 is connected across resistor 23. Decrease of the output current of rectifier 10 to zero or an abnormally low amplitude results in the operation of relay 43 to complete a circuit for energizing relay 45 from grounded battery 50. When the voltage of battery 13 decreases to a predetermined voltage, relay 44 operates to close a circuit for supplying current from grounded battery 51 to the winding of relay 46, thereby operating relay 46. Relay 22 operates when current from source 21 is being supplied through its winding. With relays 45, 46 and 22 operated, a circuit is completed for supplying current from grounded battery 53 through the winding of thermostatic relay 48 and through the armatures and contacts of relays 46, 22 and 45 to ground at 52. After a delay period equal to or somewhat greater than the time required to heat the cathodes of tubes 30 and 31 to operating temperature when starting the circuit in operation, relay 48 operates to close a circuit for supplying current from grounded battery 54 to the winding of relay 47. A circuit is thus completed for energizing lamp 40 by current from battery 55. Separate batteries 50, 51, 53, 54 and 55 are shown in the drawing for the sake of simplicity but, obviously, the voltages represented by these batteries may be derived from storage battery 13.

The operation of relay 46 in response to abnormally low voltage across battery 13 also completes a circuit for supplying current from battery 13 to the winding of a relay 56. Relay 56 when operated completes a circuit for short-circuiting resistor 14. The voltage across the load 15 is thus maintained within normal operating limits for a period after the voltage of battery 13 falls to an abnormally low voltage. By connecting the winding of relay 44 across the battery, hunting is avoided such as might occur if the winding were connected across the load.

What is claimed is:

1. In combination, rectifying apparatus for rectifying current from an alternating-current supply source and for supplying rectified current to a load, said load comprising a battery, slow operating relay means, an energizing circuit for said relay means for causing said relay means to operate after a delay interval following the completion of said energizing circuit, three switching means in series in said energizing circuit, means for closing a first of said switching means in response to current supplied from said supply source to said rectifying apparatus, means for closing a second of said switching means in response to a reduction of current supplied from said rectifying apparatus to said load to a predetermined low amplitude, means for closing said third switching means in response to a reduction of said battery voltage to a predetermined voltage, an indicating device, and means responsive to the operation of said slow operating relay means for completing a circuit for energizing said indicating device.

2. In combination, a battery, a resistor, a load circuit comprising said battery, said resistor and a load all in series, rectifying apparatus for supplying current to said load circuit comprising a thermionic device for rectifying current from an alternating-current supply source, said rectifying apparatus when started in operation supplying zero or low amplitude current to said load circuit during a delay period required for heating the cathode of said thermionic device to operating temperature, a first electromagnetic relay having a winding connected directly across said battery, said first relay being operated in response to a decrease of the voltage of said battery to a predetermined abnormally low voltage, means responsive to the operation of said first relay to complete a short-circuiting current path across said resistor, a second electromagnetic relay having a winding energized by current supplied from said rectifying apparatus to said load circuit, said second relay being operated in response to a decrease of said load current to a predetermined abnormally low amplitude, a third electromagnetic relay operated in response to current supplied from said supply source to said rectifying apparatus, a fourth relay which operates after a delay interval following its energization, said delay interval being at least as long as the delay period required for heating said cathode, means responsive to the operation of said first, second and third relays for completing a circuit for energizing said fourth relay, an indicating device, and means responsive to the operation of said fourth relay for causing the completion of an energizing circuit for said indicating device.

HARRY H. SPENCER.

REFERENCES CITED

The following references are of record in the file of this patent:

UNITED STATES PATENTS

| Number | Name | Date |
|---|---|---|
| 860,305 | Knapp et al. | July 16, 1907 |
| 1,231,991 | Bliss | July 3, 1917 |
| 1,574,747 | Auth | Mar. 2, 1926 |
| 1,681,265 | Sullivan | Aug. 21, 1928 |
| 1,702,724 | Dewar | Feb. 19, 1929 |
| 2,155,515 | Trucksess | Apr. 25, 1939 |
| 2,326,313 | Trucksess | Aug. 10, 1943 |
| 2,366,505 | Fletcher | Jan. 2, 1945 |
| 2,368,638 | Spencer | Oct. 9, 1945 |